Sept. 15, 1970  H. P. ELLIS  3,528,521

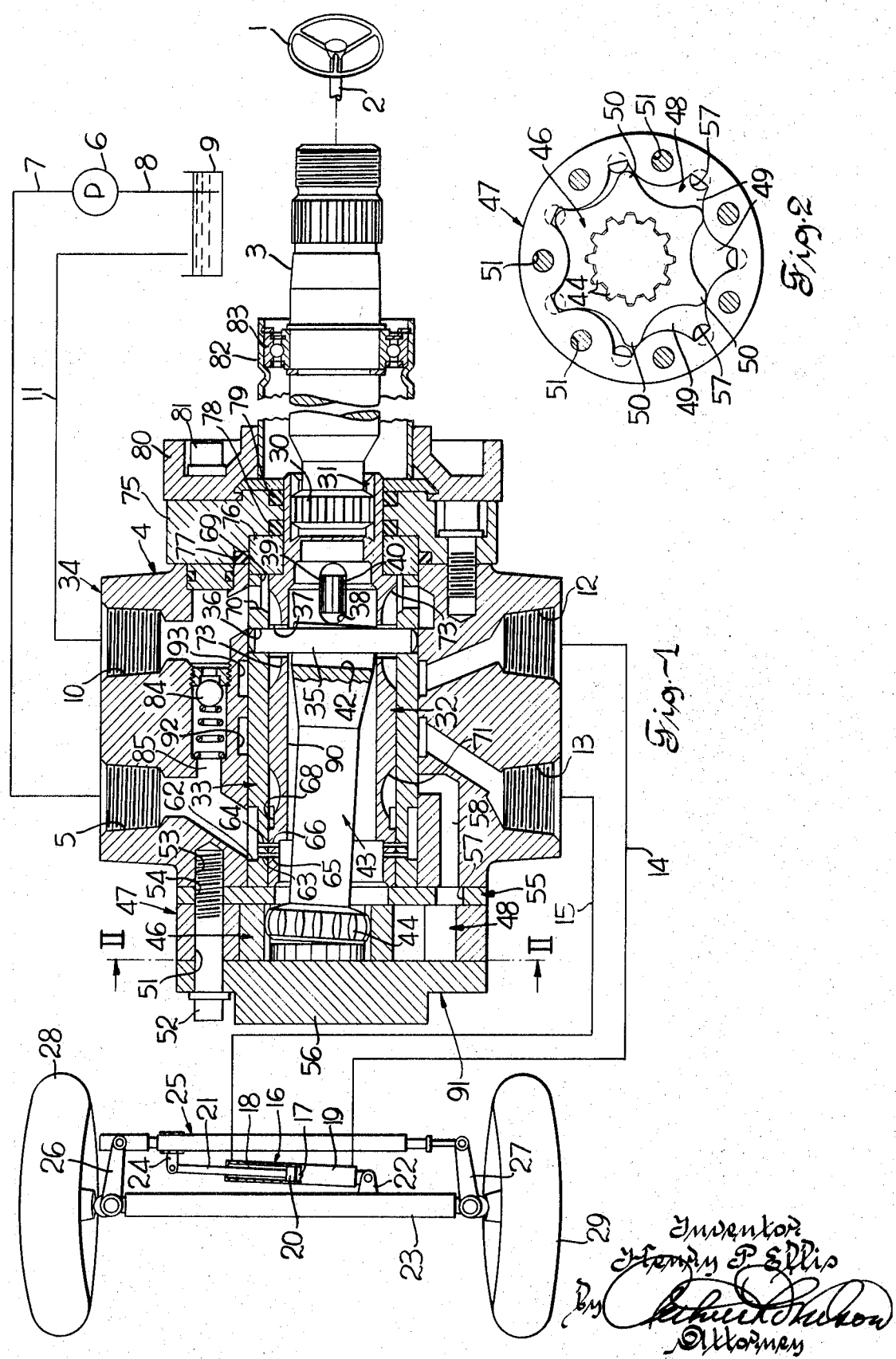

HYDRAULIC STEERING SYSTEM

Filed June 13, 1968  3 Sheets-Sheet 2

Inventor
Henry P. Ellis
Attorney

Sept. 15, 1970     H. P. ELLIS     3,528,521
HYDRAULIC STEERING SYSTEM
Filed June 13, 1968                                  3 Sheets-Sheet 3
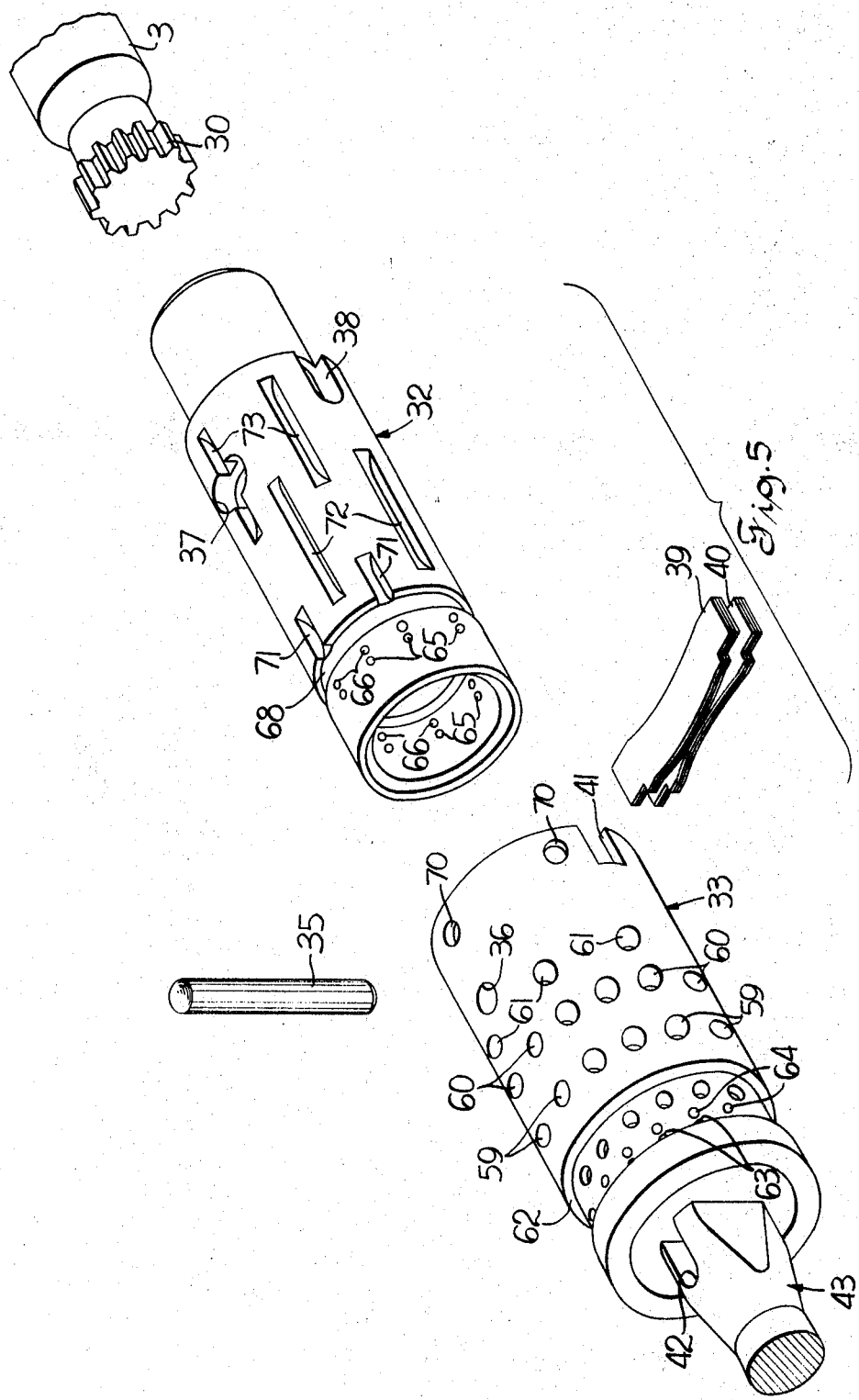
Inventor
Henry P. Ellis
By
Attorney though hydraulic fluid which is pressurized by a source
United States Patent Office 3,528,521
Patented Sept. 15, 1970

3,528,521
HYDRAULIC STEERING SYSTEM
Henry P. Ellis, West Allis, Wis., assignor to Allis-Chalmers Manufacturing Company, Milwaukee, Wis.
Filed June 13, 1968, Ser. No. 736,845
Int. Cl. B62d 5/06
U.S. Cl. 180—79.2
10 Claims

ABSTRACT OF THE DISCLOSURE

A hydraulic steering system providing balanced steering by using a single rod end piston, cylinder and metering control valve operating the steering linkage whereby the rate of steering of the steerable wheel is directly proportional to the steering wheel rotation.

---

This invention relates to a vehicle steering mechanism and more particularly to a balanced hydrostatic steering system.

Various types of steering mechanisms and hydraulic systems have been used for steering a vehicle. The conventional system using a mechanical connection between steering wheel and the steering gear maintains a direct proportion between the angular rotation of the steering wheel and the degree of steering of the steerable wheels. The mechanical system combined with a power or hydraulic system has been used in the automobile industry quite extensively. In some types of vehicles which travel at a lower speed the mechanical linkage or connection between the steering wheel and the steering gear has been eliminated. In this type of a system it is imperative that some relationship be established whereby the angular rotation of the steering wheel has a direct relationship to the degree of steering imposed on the steerable wheels. This can be accomplished by metering the rate of flow from a source of pressurized fluid and having a valve which directs flow to the right- or left-hand sides of a hydraulic actuator having a double rodded piston. In this type of a system the displacement of fluid acting on the piston on opposing sides is equal because the rod on opposing sides of the piston is the same size. It is understood that the double rodded type of fluid actuator connected to the steering mechanism operates as a tie rod between each steering arm connected to a steerable wheel on each side of the vehicle. It is more economical to eliminate the double rodded piston and replace this with a piston having a single rod extending from the cylinder while the cylinder itself forms the other connection. This may be accomplished by pivotally connecting the cylinder to the front axle of the vehicle and having the rod connected to the tie rod of the vehicle.

Balanced steering can be achieved by the combination of a control valve having metered flow connected to the hydraulic cylinder operating the steering linkage. The cylinder is made with a base end area on the piston which is equal to exactly twice that of the rod end area of the piston. In order to have the same stroke during extension and retraction the volume displacement of the oil required to extend the cylinder is twice the volume required to retract it. The flow control is satisfied by the steering valve which consists of a control valve with metering to control the volume of flow in direct proportion to the magnitude of angular rotation of the steering wheel. When the piston is extended relative to the cylinder, oil from the rod end is directed to the piston base end chamber which is connected to the source. This creates opposing forces on the piston in which fluid is not effective on the cross sectional area of the rod and greater base area will provide a greater force to extend the piston relative to the cylinder. For retraction of the piston in the cylinder hydraulic fluid is directly supplied from the source to the rod end side of the cylinder, while hydraulic fluid from the base end returns to the sump. This operation provides an equal stroke in both directions in response to an equal angular rotation of the steering wheel in either direction.

It is an object of this invention to provide the hydrostatic steering system in which the front wheels are steered in direct proportion to the magnitude of angular rotation of the steering wheel in either direction.

It is another object of this invention to provide a balanced hydrostatic steering system wherein the rod connected to the power wall of the hydraulic actuator operating the steering mechanism has an effective area equal to the cross sectional area of the rod.

It is a further object of this invention to provide a single rod end piston operating within a hydraulic cylinder wherein hydraulic fluid is supplied through a metered control valve to the rod end side of the piston to steer in the first direction and to the base end side of the piston and the rod end side to steer in the opposite direction.

It is a further object of this invention to provide a rotary control valve having metering means to supply pressurized fluid in the hydrostatic steering system whereby steering of the steerable wheels is in direct proportion to angular rotation of the steering wheel and the hydraulic actuator operating the steering mechanism is a ram type cylinder.

The objects of this invention are accomplished by providing a hydraulic system for steering the front wheels of the vehicle. A source of pressurized fluid supplies pressurized fluid to a steering wheel control valve. Angular displacement of the steering wheel causes pressurized fluid to flow through the valve and a metering device and through conduit means to the hydraulic actuator on the steering linkage. The hydraulic actuator on the steering linkage is a single rodded piston operating within a cylinder wherein the cylinder is connected to the tie rod of the steering mechanism. The control valve directs the flow of fluid to the rod end side of the piston for steering in one direction and supplies pressurized fluid to the rod end side and the base end side of the piston for steering in the opposite direction. The steering force between the steering wheel and the steerable wheels is transmitted of pressurized fluid and its flow is controlled by rotation of the steering wheel. It is understood however that the metering device operates as a pump in the event of the power failure in the system so that force applied to the steering wheel is used to steer the steering gear linkage in the event of power failure.

The preferred embodiment of this invention will be described in the following paragraphs and is illustrated in the attached drawings in which:

FIG. 1 is a cross sectional view of the control valve and metering device with the hydraulic system and steering linkage schematically illustrated;

FIG. 2 is a fragmentary cross section view taken on line II—II of FIG. 1;

FIG. 5 is an exploded view of portions of the control valve.

Figure 3:
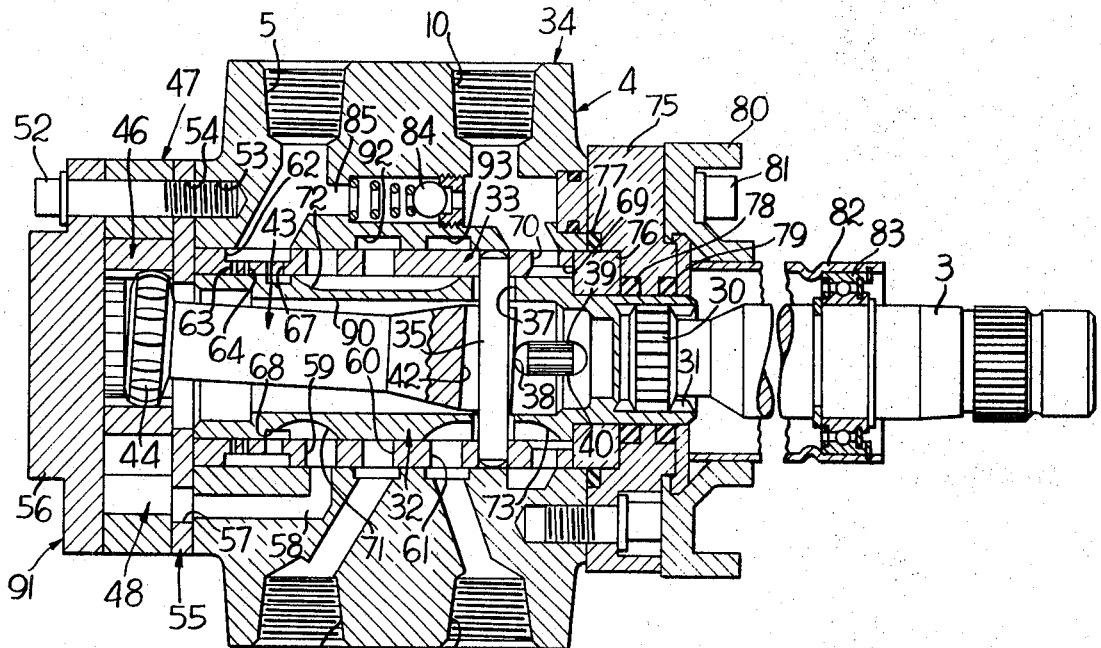
FIG. 3 is a cross section view of the valve in the right turn position.

Referring to the drawings, FIG. 1 illustrates the steering wheel 1 connected to the steering column 2 including a shaft 3 extending into the valve 4. The valve is connected by means of the inlet port 5 to the pump 6 through conduit means 7. The low pressure side of the pump 6 is connected by the conduit 8 to the fluid reservoir 9 more commonly known as the sump.

The return side of the valve 4 forms the port 10 which is connected by a conduit 11 to the reservoir 9. The valve 4 also has two actuator ports 12 and 13 which receive the conduits 14 and 15, respectively. A fluid actuator 16 defines pressurizing chambers 17 and 18 by means of cylinder housing 19 and piston 20. The piston 20 is connected to the rod 21. The cylindrical housing 19 is pivotally connected to the bracket 22 which is fastened to the front axle 23. The rod 21 is also connected to the arm 24 on the tie rod 25. The tie rod 25 extends transversely between the arms such as steering arms 26 and 27 which are in turn connected to the king pins of the steerable wheels 28 and 29, respectively.

The steering linkage does not utilize the two rod end pistons which form the tie rod in conventional steering linkages. The single rod end piston 20 simplifies the hydraulic actuator and is more economical to manufacture. The actuator 16 operates between the front axle 23 and the tie rod 25 whereby movement of the tie rod relative to the front axle causing steering arms 26 and 27 to pivot about their respective king pins to provide steering of the vehicle. The actuator 16 is so constructed that the cross sectional area of the rod 21 is equal to one-half of the cross sectional area of the piston 20. The effective area upon which the pressurized fluid operates in the chamber 18 is equal to the area of the piston 20 which surrounds the rod 21. When pressurized fluid enters the chamber 18 it retracts the rod 21 within the actuator 16.

When the rod 21 is extended from the cylinder 19 fluid is permitted to flow from chamber 18 into chamber 17 and the effective area upon which pressurized fluid operates to produce extension of the rod 21 relative to the cylinder 19 is the cross sectional area of the rod 21. The area of the piston surrounding the rod 21 creates equal and opposite reaction force with the corresponding area on the opposite side of the piston 20 which cancel each other and are ineffective in moving the piston 20.

Figure 4:
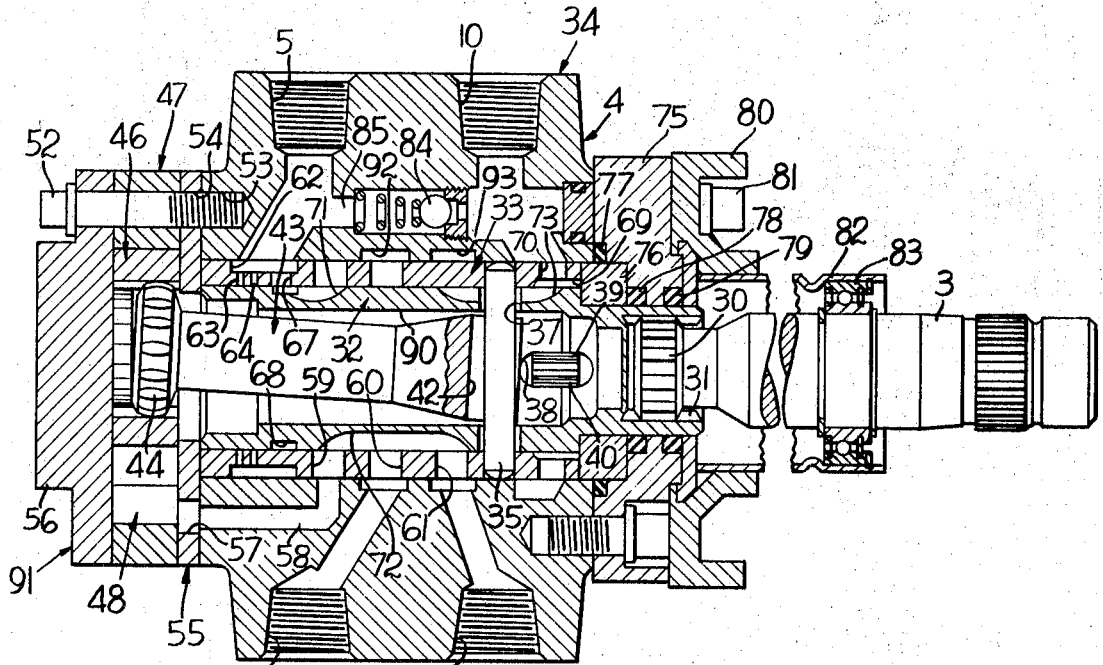
FIG. 4 is a cross section view of the valve in the left turn position.

The valve 4 controls the flow of pressurized fluid from the pump 6 through the valve and returning directly to the reservoir 9 when the valve is neutral as illustrated in FIG. 1. The valve controls the direction of pressurized fluid to the ports 12 and 13 to operate the actuator 16 which controls the steering of the vehicle during steering. FIG. 3 illustrates the valve in the position where pressurized fluid is supplied to the rod side of the piston 20 when the vehicle is in the right turn position. FIG. 4 illustrates the valve in the position wherein the pressurized fluid is supplied to both sides of the piston 20 and the vehicle is turned to the left.

The valve is rotated by means of the steering shaft 3 which has a splined portion 30 which engages the internally splined portion 31 of the spool 32. The spool 32 is received within the sleeve 33 and rotates coaxially within the sleeve and the housing 34. The sleeve 33 is fitted within the housing 34 and also rotates relative to the housing 34 and is permitted to rotate through limited rotation relative to the spool 32. The pin 35 is received within transverse openings 36 in the sleeve 33 and enlarged openings 37 and the spool 32 to permit limited rotational movement between the spool 32 and the sleeve 33. Lateral openings 38 are formed in the spool 32 which receive the springs 39 and 40. The springs 39 and 40 each consist of a plurality of leaves in stacked relationship which are received within the end slots 41 in the sleeve 33. The springs 39 and 40 are compressed together and inserted within the lateral openings 38 of spool 32 and in turn are forced into the end slots 41 of sleeve 33 to resiliently hold the spool 32 in the sleeve 33 with the pin 35 centrally located within the enlarged openings 37 of the spool 32. The force causing rotational movement of the shaft 3 is transmitted through the spline connection between the shaft 3 and spool 32. The force is in turn transmitted to the sleeve 33 through the springs 39 and 40. The sleeve 33 is directly connected to the pin 35 which in turn lies in a transfer slot 42 in the link 43. The link 43 has splined teeth 44 which engage mating spline portion of the star wheel 46. Accordingly, the mechanical force transmitted through the spool 32 to the sleeve 33 is transmitted to the pin 35 to the star wheel 46. Any resistance to rotation created by the star wheel 46 causes the springs 39 and 40 to distort and change the relative rotational position between the spool 32 and the sleeve 33.

The star wheel 46 as shown in FIG. 2 has 6 gear teeth formed on its external periphery. A stationary casing 47 forms a cavity 48 having seven internal chambers 49 angularly spaced about its inner periphery which in turn sequentially receive a gear tooth 50 from the star wheel 46. The chambers 49 formed between the external periphery of the star wheel 46 and the internal periphery of the casing 47 are expansible and contractable as the star wheel 46 is rotated within the casing 47. The casing 47 has a plurality of bolt openings 51 angularly spaced about the central cavity 48 for receiving the plurality of bolts 52 which, threadedly engage threaded openings 53 in the housing 34. Similarly, a plurality of equally spaced bolt openings 54 are formed in the spacer 55 which is compressed between the casing 47 and the housing 34 when the casing is fastened by the bolts 52. The bolts 52 also extend through an end cap 56 upon which the heads of bolts 52 compressably force the casing 57 and the spacer 55 in fixed relationship to the housing 34.

The variable volume chambers 49 are in constant communication with a plurality of angularly spaced openings 57 in spacer 55.

The plurality of openings 57 are also in communication with plurality of passages 58 in the housing 34 which extend axially and radially and are sequentially in communication with a plurality of ports 59 which radially extend through the sleeve 33. The sequential communication between the ports 59 and the passages 58 will be described subsequently.

Similarly, a plurality of angularly spaced ports 60 are axially spaced relative to said ports 59 in the sleeve 33. The cylinder ports 60 transmit pressurized fluid to and from the metering unit 91 depending on the angular position of spool 32 relative to sleeve 33. A second set of ports 61 are also axially spaced from ports 60 and consist of half the number of ports 60. Actuation of the actuator 16 is controlled by communication through the ports 60 and 61 to provide steering of the vehicle.

Annular recess 62 is formed in sleeve 33 wherein ports 63 and 64 are formed to transmit fluid from the annular recess 62 which continue to pass through mating ports 65 and 66 in the spool 32 when the valve is in neutral. Plurality of inlet ports 67 are also angularly spaced within the recess 62, which provide communication between the annular groove 68 in spool 32 and the annular recess 62 in the sleeve 33.

Sleeve 33 is formed with the internal facing 69 having a slightly larger diameter than the internal sleeve diameter. Angularly spaced in the end portion of the sleeve opening to facing 69 are a plurality of outlet radial openings 70.

A spool 32 is formed with a plurality of angularly spaced commutator slots 71 and a plurality of angularly spaced transfer slots 72. A plurality of discharge slots 73 are also formed in the external surface of the spool 32. The commutator slots 71 extend axially into an annular groove 68 on the external side of the spool 32.

Housing 34 is fitted with end plate 75 which is seated on the end of the housing and embraces a collar 76 and a seal 77. The end plate 75 also encircles the seals 78 and 79 which receive the end of the spool 32. The cover 80 is fastened by a plurality of screws 81. The cover 80 retains a bearing support 82 which supports bearing assembly 83 which journals shaft 3. A check valve 84 is positioned in a cross passage 85 intermediate inlet port 5 and outlet port 10.

The operation of the steering system will be described in the following paragraphs.

The steering wheel 1 is positioned in the central unrotated position as shown in FIG. 1. In this position the valve is also in the neutral position and the steerable wheels 28 and 29 are aligned for straight ahead movement of the vehicle. In this position inlet port 5 supplies pressurized fluid from pump 6 which flows through the annular recess 62 in the sleeve 33 through the inlet ports 63 and 64 which are aligned with the inlet ports 65 and 66 of the spool 32. The pressurized fluid flows into the central opening 90 within the spool 32 and flows axially through the central opening until it reaches the enlarged transverse opening 37 in the spool 32 from which it flows into an outlet slot 73. The exit ports 70 in the sleeve 33 then return fluid to the outlet port 10 and conduit 11 to the reservoir 9. In this position of the valve the actuator 16 does not change position and pressurized fluid fills the chambers 18 and 17 and the steering gear continues in its fixed position for straight ahead movement of the vehicle. The function of the metering unit 91 is to meter the flow of pressurized fluid to the actuator 16. Fluid flow through metering unit 91 is blocked and flow to and from the actuator 16 is blocked as shown in FIG. 1.

It is understood that the housing 4 and spacer 55 are formed with a plurality of seven passages 58 and 57 respectively, which enter each of the plurality of chambers 49 formed in a cavity 48. The chambers 49 are variable volume chambers depending upon the position of the star wheel 46. When the star wheel 46 is in the position where one of the teeth 50 are completely received within a mating chamber 49 the volume of the chamber is at its minimum. Likewise, when the corresponding gear tooth 50 is fully withdrawn from a chamber 49 the chamber is at its maximum volume.

It is understood that as a tooth on the star wheel 46 is moving into the chamber, fluid is being displaced from the chamber 49 and passes outwardly through opening 57 and passage 58. At this phase of the cycle chamber 49 and mating port 59 are in communication with a transfer passage 72 to transfer fluid to the annular recess 92 and/or 93 depending on whether the valve is turned to the right- or left-hand position. It is also understood that when the chamber 49 is increasing in volume the opening 57 and passage 58 must be in communication with the inlet port 5 as pressurized fluid is supplied to the metering device creating a torque on the star wheel 46. The proper relationship is critical for proper operation and is accomplished by providing the mechanical and hydraulic relationship between the star wheel and the ports 59. The spool 32 as previously mentioned, is resiliently connected to the sleeve 33 through the springs 39 and 40. The sleeve 33 is directly connected to the link 43 by the pin 35 which in turn is connected by the splined portion to the internal splined portion of the star wheel 46. Accordingly, the movement of the sleeve 33 and the star wheel 46 is synchronized. When pressurized fluid is supplied to the chambers 49 which are increasing in volume and low pressure is vented from the chambers 49 decreasing in volume, a torque is applied to the star wheel 46 of the metering unit 91. The direction of rotation of the steering wheel 1 controls the direction of rotation of the star wheel 46. The direction of rotation of the shaft 3 also controls commutation of fluid flow through the valve.

Depending on the direction of rotation the springs 39 and 40 are deformed permitting alignment of the commutator slot 71 of spool 32 with the corresponding port 59 of sleeve 33. This in turn controls which chambers are expanding in volume and which chambers are contracting in volume.

Referring to FIG. 3, the right turn position for the valve is shown, causing a misalignment of the ports 63 and 64 with the ports 65 and 66, respectively. This blocks communication between the inlet port 5 and the central opening 90 and the spool 32. This in turn provides alignment of the commutator slot 71 with the ports 59 providing communication through the passage 58 in the housing 4, and the opening 57 in the spacer 55 and chamber 49 on the left-hand side as shown in FIG. 2. The pressurized fluid must flow through the metering unit 91 before it passes into the actuator 16. Likewise, the chambers 49 of the right-hand side, as shown in FIG. 2, which are decreasing in volume will be connected to the ports 59, through opening 57 and passage 58 to the transfer slot 72. The ports 59 in communication with the transfer slot 72 provide communication to the annular recess 92. Only the annular recess 92 is in communication with the port 13 which in turn supplies pressurized fluid to the chamber 18 which withdraws the rod 21 into the cylinder 19 causing a right turn of the vehicle. Fluid within the chamber 17 passes through the port 12, outlet slot 73, through the port 70, port 10, and return conduit 11 to the reservoir 9.

When the vehicle wheel is returned to its center position the valve again is returned to its neutral position as shown in FIG. 1. When the vehicle wheel is turned in the left-hand direction, communication between ports 63 and 64 and 65, 66 are misaligned causing communication through the inlet port 5 and plurality of ports 67 to the annular groove 68 in the spool 32. The annular groove 68 is in communication with the commutator slots 71 which in turn are then in communication with passages 58 and openings 57 to chamber 49. Accordingly, the commutator slots 71 are in communication with alternate ports 59 which reverses the direction of fluid flow through the metering unit 91. With the reversal of the direction of fluid flow through the metering unit 91, pressurized fluid is supplied to the chambers 49 on the right-hand side, as shown in FIG. 2, which are now expanding. The chambers 49 on the left-hand side of FIG. 2 are now contracting in volume and the fluid will flow from these chambers into the transfer slots 72. As shown in FIG. 4 the transfer slots 72 are in communication with both ports 60 and 61 which in turn are in communication with the annular recesses 92 and 93, and ports 13 and 12, respectively. Accordingly, pressurized fluid is supplied to both sides of the piston 20 and pressurized fluid from chamber 18 flows through the valve back into chamber 17 and the actuator 16 is extended. This in turn causes a left turn of the vehicle. No pressurized fluid is permitted to pass to the reservoir, it is only transferred from chamber 18 to chamber 17 when the valve is in left turn position as shown in FIG. 4. The fluid flow continues until the deformation of the springs 39 and 40 are overcome and the ports 59 and slots 71 are misaligned. The wheels 28 and 29 continue in the degree of turn depending on the angular rotation of the wheel 1. The metering unit 91 operates as a motor to cause pressurized fluid from the pump 6 which in turn drives the actuator 16 and provides hydraulic power steering of the vehicle.

It is further pointed out that if the pump 6 fails the metering unit 91 would operate as a pump in itself and fluid would be pumped through the actuator in the same manner as described. However, the power would be supplied by the steering wheel 1 from the operator.

It can be seen that a power steering system as described provides power steering of a vehicle. The system has the safety feature of manual steering of a purely hydraulic system even through there may be power failure of the pump 6. It is further pointed out that the linkage for the steering mechanism as shown for the front wheels is a simplified steering system wherein a single rod and piston can be used. Although a single rod end cylinder is used, the balanced steering of the vehicle is preserved which is necessary if the steering of the vehicle is in direct proportion to the degree of turn of the steering wheel in either direction. If this were not present, the operator would be inclined to oversteer in one direction in which the lesser amount of fluid was required to steer for a given rotation of the steering wheel.

The preferred embodiments of this invention have been illustrated and described and the scope of this invention is defined by the attached claims.

The embodiments of the invention in which an exclusive property or privilege is claimed are defined as follows:

1. A balanced hydrostatic steering system comprising a steering linkage, a hydraulic fluid actuator operating said steering linkage and having a power wall and a power transmitting rod connected to one side of said power wall defining a rod end chamber and another chamber adapted for receiving pressurized fluid, said rod end chamber having a cross sectional area equal to half the effective area of said other chamber, a rotating valve including housing means defining an inlet passage, an outlet passage, and two-actuator passages with each actuator passage connected in communication with one of said chambers in said fluid actuator, a source of pressurized fluid connected to said inlet passage of said valve, a fluid reservoir in communication with said outlet passage of said valve, a rotating spool in said valve connected to the steering wheel and defining a plurality of ports, a sleeve in said housing receiving said spool and defining ports for selective communication with said spool ports and providing selective flow passages through said valve connecting said source with said rod end chamber and said other chamber with said reservoir and connecting said source with said rod end chamber and said other chamber, a fluid metering means having rotor means metering fluid for selectively receiving fluid from said valve and delivering fluid to said valve in response to rotation of said rotor means, resilient means connecting said spool with said sleeve and defining a neutral position of said spool relative to said sleeve permitting fluid flow from said inlet passage to said outlet passage, connecting means connecting said rotating spool of said valve to said rotor means to synchronously rotate said rotating spool with said steering wheel and selectively and alternately rotate and counter rotate said spool relative to said sleeve against the biasing force of said resilient means to supply pressurized fluid in either direction through said metering means to said fluid actuator ports to thereby provide a hydraulic power steering selectively and alternatively supplying pressurized fluid to the rod end chamber or both of said chambers in response to rotation of said steering wheel.

2. A hydrostatic steering system as set forth in claim 1 wherein said actuator comprises a hydraulic cylinder and a single rod piston defining a cylinder end hydraulic cylinder chamber and a rod end hydraulic fluid chamber wherein said rod defines one-half the cross sectional area of said cylinder end chamber.

3. A hydraulic actuator as set forth in claim 2 including a front axle of a vehicle connected to the cylinder end of said hydraulic actuator a tie rod of the steering linkage connected to the rod end of said hydraulic actuator.

4. A hydraulic steering system as set forth in claim 2 wherein said metering means includes a rotor gear, and a stator gear housing having one more tooth than a plurality of teeth of said rotor gear and said rotor gear and stator gear housing mesh to meter the fluid supplied to said hydraulic actuator.

5. A hydrostatic steering system as set forth in claim 2 wherein said rotating valve includes said spool adapted for connection to a steering wheel, said sleeve receiving said spool and posiitoned centrally within said housing, said spool defining a plurality of slots and ports, resilient means and a loosely fitted pin connecting said spool to said sleeve, said resilient means and pin selectively and alternatively permitting commutating communication from said inlet port in said housing through said metering means to said rod end chamber of said actuator and from said inlet port through said metering means, and to said rod end chamber and said cylinder end chamber to provide steering in the opposite direction in response to rotation of said steering wheel.

6. A hydraulic steering system as set forth in claim 1 wherein said rotating valve includes a check valve between said outlet passage and said inlet passage commutator means to selectively and alternatively provide communication from the inlet passage through said metering means to said rod end chamber, and said rod end chamber and said other chamber to control direction of rotation of the steering linkage when said steering wheel is rotated.

7. A hydrostatic steering system as set forth in claim 1 wherein said rotary valve means consists of a spool adapted for connection to the steering wheel and a sleeve encircling said spool rotatably mounted in said housing and having resilient means connecting said spool to said sleeve to permit relative rotational movement between said spool and said sleeve to provide commutation and control the flow through said metering means in response to direction of rotation of said steering wheel.

8. A hydraulic steering system as set forth in claim 6 wherein said rotary means connected to said sleeve provides commutation and flow of pressurized fluid to assist rotation of said rotor means to thereby provide power steering as the pressurized fluid flows through said metering means and to said hydraulic fluid chambers and said actuator.

9. A hydrostatic steering system as set forth in claim 1 wherein said rotating valve includes said spool adapted for connection to a steering wheel, said sleeve encircling said spool and having communicating ports, said resilient means resiliently connected to said spool to said sleeve, said connecting means includes a link connecting said sleeve to said rotor means, said metering means comprising a rotor gear, a stator housing defining an internal gear having a plurality of teeth exceeding the number of teeth in said rotor by at least one, said spool thereby shifting rotationally relative to said sleeve to selectively and alternatively provide commutation of the flow of fluid to said rod end chamber to provide steering in one direction, and said rod end chamber and said cylinder end chamber to provide steering in the opposite direction.

10. A hydrostatic system as set forth in claim 1 wherein said rotating valve means includes said spool adapted for connection to the steering wheel, said sleeve encircling said spool and having radial ports formed therein, said resilient means resiliently connected to said spool and said sleeve and biasing said sleeve to misalign ports in said sleeve with the slots in said spool to provide communication between the inlet port and the outlet port through radial parts when said valve is in the neutral position, said spool selectively and alternatively providing communication from said inlet port through said metering means to said rod end chamber for steering in a first direction and communication from said inlet port through said metering means to said rod end chamber and said cylinder end chamber for steering in a second direction.

(References on following page)

References Cited

UNITED STATES PATENTS

| | | | |
|---|---|---|---|
| 2,163,892 | 6/1939 | Sanford | 180—79.2 X |
| 2,906,361 | 9/1959 | Ziskal | 180—79.2 |
| 2,984,215 | 5/1961 | Charlson. | |
| 3,059,717 | 10/1962 | Moyer et al. | 180—79.2 |
| 3,348,493 | 10/1967 | Easton. | |
| 3,385,057 | 5/1968 | Pruvot et al. | 180—79.2 X |

FOREIGN PATENTS 1,324,428  3/1963  France.

LEO FRIAGLIA, Primary Examiner

J. A. PEKAR, Assistant Examiner

U.S. Cl. X.R.

91—417, 467